United States Patent [19]
Nikolich

[11] Patent Number: 4,549,344
[45] Date of Patent: Oct. 29, 1985

[54] METHOD OF DRIVING FASTENERS WITH A BUMPERLESS PNEUMATIC GUN

[75] Inventor: Milovan Nikolich, Skokie, Ill.

[73] Assignee: Signode Corporation, Glenview, Ill.

[21] Appl. No.: 499,370

[22] Filed: May 31, 1983

Related U.S. Application Data

[62] Division of Ser. No. 208,215, Nov. 19, 1980, Pat. No. 4,401,251.

[51] Int. Cl.[4] .......... B23P 11/00
[52] U.S. Cl. .......... 29/432; 29/526 R; 91/209; 173/139
[58] Field of Search .......... 29/432, 526 R; 227/130, 227/120, 156; 91/293, 488, 216 R, 209, 166; 173/139; 92/156

[56] References Cited

U.S. PATENT DOCUMENTS 2,527,757 10/1950 Mitchell .......... 173/139
2,993,208 7/1961 Cast et al. .......... 227/130 X
3,032,998 5/1962 Atkinson .......... 173/139 X
3,106,136 10/1963 Langas et al. .......... 227/130 X
3,190,187 6/1965 Doyle .......... 227/130 X
3,278,103 10/1966 Juilfs et al. .......... 227/130
3,278,104 10/1966 Becht et al. .......... 227/130
3,278,105 10/1966 Juilfs et al. .......... 227/130
3,815,475 6/1974 Howard et al. .......... 227/130 X
3,964,659 6/1976 Eiben et al. .......... 227/130 X
3,969,989 7/1976 Maurer et al. .......... 227/130 X
4,211,352 7/1980 Zilka .......... 227/130

*Primary Examiner*—Charlie T. Moon
*Attorney, Agent, or Firm*—Dressler, Goldsmith, Shore, Sutker & Milnamow, Ltd.

[57] ABSTRACT

A fastener applying tool driven by air in a driving stroke and a return stroke featuring noise and recoil reduction and increased efficiency, driving force, and speed of operation. Air directed into the main cylinder to force the main piston through its driving stroke is stored in a chamber to rapidly return the main piston. Air compressed by the main piston at one end of the main cylinder is used to form an air cushion to keep the main piston from striking the bottom of the cylinder. The main piston cycles within a slidably mounted main cylinder. Pressurization of one end of the main cylinder during the driving stroke repositions the main cylinder to close the main valve to shut off high pressure air from the main piston and open a valve to vent the air above the piston to atmosphere. Upward movement of the cylinder and rapid return of the piston significantly reduces the recoil force normally experienced in such a tool. A valve assembly coaxially located at the opposite end of the main cylinder functions to admit and exhaust air to pressurize and vents the piston and main cylinder respectively. Noise suppression is achieved by an elastomeric cap. Rapid acting components reduce air wastage and improve overall tool efficiency.

10 Claims, 11 Drawing Figures

METHOD OF DRIVING FASTENERS WITH A BUMPERLESS PNEUMATIC GUN

This is a division of application Ser. No. 208,215, filed Nov. 19, 1980, now U.S. Pat. No. 4,401,251.

DESCRIPTION

1. Technical Field

A pneumatic fastener applying tool for the application of staples, nails and the like. A recoil resistant piston and cylinder in combination with a complementary pressurizing and vent valve assemblage and a resilient noise attenuator are used to lower operating sound levels, reduce tool recoil and improve overall performance.

2. Background of the Invention

With the increased emphasis on occupational health and safety and the growing awareness of factors effecting worker productivity heretofore standard tools and methods must be re-examined in light of these requirements. Two factors are of particular importance in the operation of pneumatic fastener driving tools.

One is the noise level accompanying the expansion and venting of tool operating air. High noise levels in close proximity to the operator's ears can result in degradation of hearing over one's working life.

In addition, while such tools eliminate the muscular effort accompanying the operation of a manual stapler or a hammer, the high operating speed of such tools results in more vibration and stress being applied to the worker's hands and body. This is also a concern because the accuracy at which the worker positions his tool becomes degraded as fatigue sets in the worker's hands and arms. Consequently, fastener driver tools featuring low noise and reduced recoil force should receive widespread acceptance by the industry.

Pneumatically driven fastener driving tools per se have become quite common in the art. One excellent example is described by A. Langas in U.S. Pat. No. 3,106,136, which is assigned to the assignee of the present invention. Another example is U.S. Pat. No. 3,815,475 by Howard and Wilson (also assigned to the assignee of the present invention.)

With the general acceptance of these tools, it has become desirable to furnish units which, in addition to reducing noise and vibration, feature increased speed of operation, reduced air consumption and a higher energy output. Equally important is the desirability that these improvements be implemented in as simple an arrangement as possible. Such simplicity has been found to increase reliability and reduce manufacturing costs. Heretofore, no one tool has been successful in attaining these goals in the manner present in the tool forming the subject of this patent application.

SUMMARY OF THE INVENTION

The present invention is an air operated fastener driving tool featuring: pneumatic arrest of the descending piston; automatic piston return; a sliding cylinder for rapid main valve action; and a resilient noise attenuator. These design features are incorporated without compromising energy output while reducing overall air consumption.

The tool includes a main housing that provides support for the main elements and principal components. These elements include: a magazine of fasteners such as staples or nails; an air reservoir joined to a source of pressurized air; a movable working cylinder; a working piston having a fastener driving device at one end with the opposite end open to a controlled supply of compressed air; and a means for pressurizing and venting the working piston and cylinder.

High pressure is not introduced into the cylinder above the working piston until the venting means is closed off which avoids loss of air and thus improves the volumetric efficiency of the tool. A unique snap action valve controls the operation of the pressurization and venting means and hence the operation of the working piston and results in quicker operation of the tool. Pressurizing the working piston drives the fastener into the workpiece. Venting the chamber above the working piston allows the working piston to be quickly returned to its original position.

A trigger-operated valve controls the position of the snap action valve. The snap action valve features a rapid response time and negligible flow resistance. This large flow passing capability area provides rapid pressurization and venting of the working piston. Specifically, the snap action valve controls operation of the pressurization and venting means. The pressurization and venting means is coaxially located relative to the axis of the working piston and working cylinder.

The novel design of the pressurizing and venting means provides a rapid admission and venting of air from the working piston and cylinder. Specifically, actuation of the snap action valve results in rapid dumping of the high pressure air acting to keep closed the valve controlling the flow of high pressure air into the cylinder containing the working piston. Pressurized air from the housing can thus quickly act on the working piston to drive a fastener into position.

Forcing the working piston through its driving stroke rapidly compresses the air between the return side of the working piston and the lower end of the working cylinder. Part of this compressed air moves through one-way check valves on the cylinder wall into a return or lower chamber defined by the housing and the lower end of the working cylinder. As the working piston is driven through its stroke, the air pressure in the return chamber and the air pressure on the return side of the working piston rapidly increase. As the working piston approaches the end of its downward or driving stroke, two things happen:

First, the compressed air at the bottom end of the working cylinder develops greater and greater force against the descending working piston. This force acts to deaccelerate the working piston and the compressed air cushion ultimately serves as a bumper which precludes contact between the tool housing and the working piston. Avoiding physical contact reduces the impulse force applied to the worker's hands and significantly reduces the operating noise of the tool. This is a significant advance over the tools that heretofore employed resilient bumpers for the driving piston which bumpers presented a severe wear problem and required periodic replacement.

Second, since the working cylinder is movable by design, the building up of pressure at the bottom end of the working cylinder also acts to lift the cylinder upwardly. Using the energy of the compressed air in this manner further dissipates the energy of the working piston and the force directed to the worker's hands. This feature has not heretofore been incorporated into pneumatic nailers or similar tools. The effect is significant. In addition, the upward movement of the working cylinder acts to quickly shut off the supply of high pressure air from the high pressure chamber. Finally, after the high pressure chamber is cut off from the cylinder further upward movement of the working cylinder opens a vent path between the working cylinder and the atmosphere. Once high pressure air to the working piston has been shut off and the atmospheric vent has been opened, the working piston moves quickly upwardly through its return stroke. Initial upward force is provided by the highly compressed air between the working piston and the bottom end of the working cylinder. Then a set of check valves at the bottom of the working cylinder opens to admit the compressed air that was stored in the lower chamber during the driving stroke of the working piston. Continued expansion of this air aids in moving the working piston through its return stroke.

When air in the working cylinder is vented to atmosphere, the air is ducted through a noise suppression chamber. The noise suppression chamber contains a tortuous path and series of corrugations to reduce the velocity of the venting gases. The suppression chamber includes a elastomeric cap that includes a circumferential rim that envelops the housing of the tool. This elastomeric rim is deformed during the venting process to allow the gases to escape to the atmosphere. When venting is completed the pressure of the venting gases is reduced to that of the atmosphere and the elastomeric edges seal the noise suppression chamber from the atmosphere. This action further reduces the high frequency noise being emitted. The elastomer itself serves as a low frequency sound attenuator. The overall effect of the noise suppression chamber is to produce a considerable reduction in noise over a broad range of frequencies.

As the working piston approaches the upper end of its return stroke, the venting is shut off. Subsequent release of the trigger-operated valve by the operator results in repositioning of the snap action valve to admit high pressure air to reposition the pressurizing and venting valve means. This results in the working cylinder being lowered to open a vent path between the working cylinder and atmosphere.

It should be noted that the design of the tool features a series of actions and reactions of movable components within the housing. Repositioning major components reduces the recoil force directed to the operator. Furthermore, by using valves having a rapid response time and using valves passing a large quantity of fluid, less air is wasted and the overall utilization of air is improved. Quick response time coupled with lower noise per pulse also improves the protection provided the worker from an occupational safety point of view.

DETAILED DESCRIPTION

Figure 1:
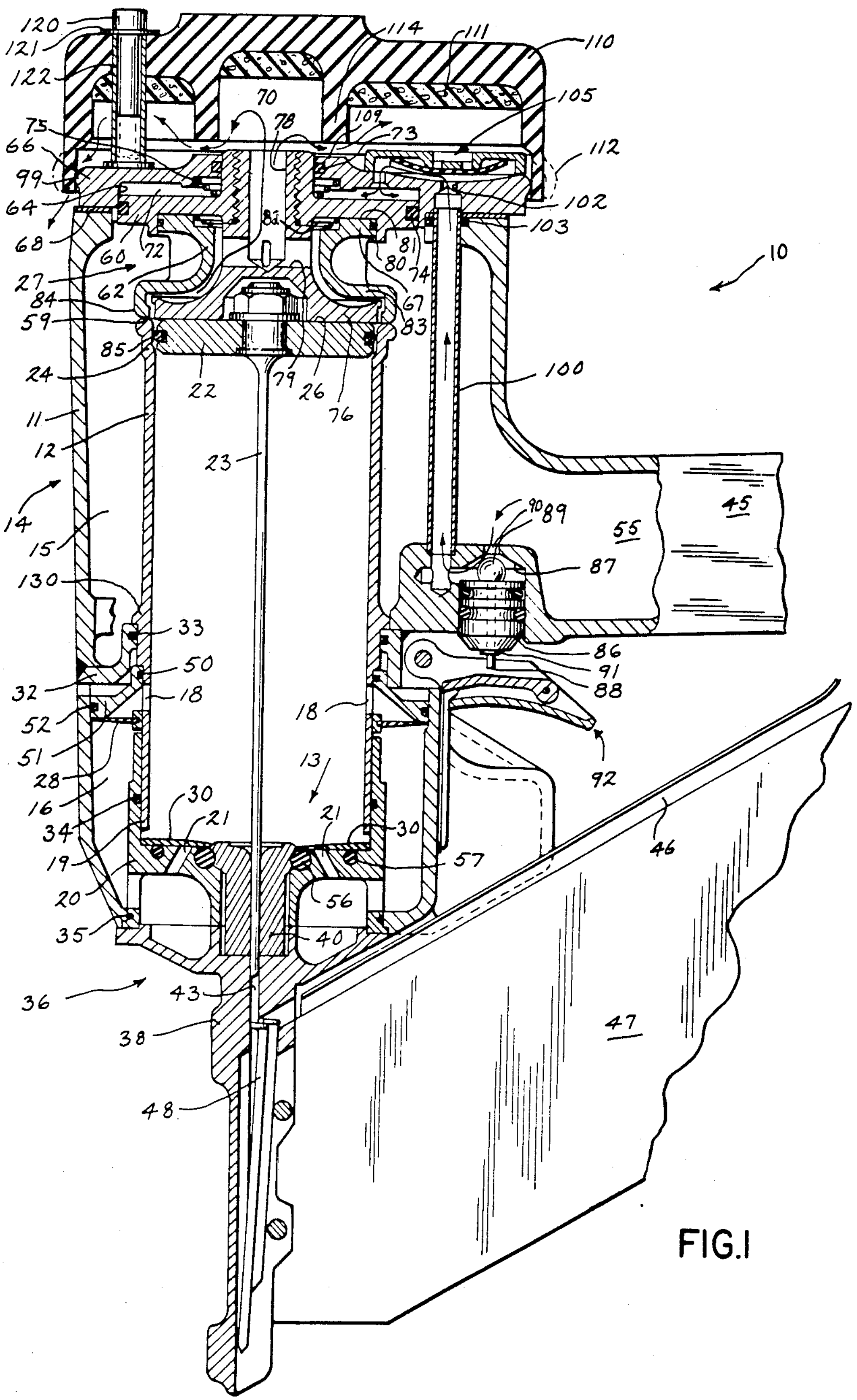
FIG. 1 is a partial, cross-sectional, side, elevational view of the fastener driving tool illustrating the relative position of the principal components with air supplied to the tool but before being triggered into operation.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

COMPONENT PARTS

FIG. 1 illustrates a fastener driving tool 10 having a hollow housing 11 and an upright working cylinder 12 within a generally cylindrical portion 14 of the housing 11 so as to define a generally annular region therebetween divided into upper chamber 15 and lower chamber 16. Lower chamber 16 is completely sealed from the remainder of the tool except for upper circumferentially spaced ports 18 on the working cylinder walls (adjacent to the lower end 19 of the working cylinder 12) and lower ports 21 in the base 13 of the working cylinder 12 (immediately adjacent to the lower end 19 of the working cylinder). Lower ports 21 are spaced from upper ports 18.

The working cylinder 12 is open at both ends and is slidably mounted within the tool housing 11 by a lower cylinder guide 20 (at the lower end of the cylindrical portion 14 of the housing) and an upper cylinder guide 32 (toward the middle of the working cylinder"). It should be noted that the working cylinder is not of uniform cross-sectional area. Specifically, the lower end 19 of the working cylinder 12 is generally one half the thickness of the upper end 24. The inside diameter of the working cylinder 12 is generally the same throughout the length of the working cylinder. The lower cylinder guide 20 not only guides the cylinder axially but also provides additional strength to the working cylinder side walls. The purpose of reducing the cross-sectional area of the lower end of the working cylinder will be discussed later.

A working piston assembly 22 carrying a fastener driver 23 is mounted within the working cylinder 12 so as to be reciprocal between an upper retracted position (adjacent to the upper end 24 of the working cylinder 12) and a lower driven position (adjacent to the lower end 19 of the working cylinder 12) by pressurized driving air. This air is admitted at the upper end 24 of the working cylinder 12 acting against the upper side 26 of the working piston 22. An O-ring 85 provides a seal between the two faces of the working piston 22 and the working cylinder 12.

The admission and venting of pressurized air into the working cylinder 12 is controlled by a main valve assembly 27 located adjacent the upper end 24 of the cylinder. This valve assembly 27 provides a means for pressurizing and venting the chambers contiguous both faces of the working piston 22 in the working cylinder 12.

Pressurized air for operating the tool and driving the working piston 22 from its upper or retracted position to its lower or driven position is supplied at one end of the housing portion 45 by a connection (not shown) to an external supply of high pressure air. Upper chamber 15 is in direct communication with the interior of the housing portion 45, which interior acts as a storage chamber 55 for receiving high pressure air from the external supply.

High pressure air is admitted to the space above the working piston 22 at the upper end 24 of the working cylinder 12. A main valve assembly 27 or working piston pressurizing and venting means seats against the uppermost circumferential edge 59 of working cylinder 12. The main valve assembly 27 includes two major components, an upper piston assembly 60 and a lower piston assembly 62 coaxially located within each other with the lower piston 62 nested within the upper piston 60.

The upper piston 60 in turn is slidably disposed within an upper cylinder 64 defined by a fixed cover 66. The cover 66 seals against the top of the cylindrical portion 14 of the tool's housing 11 through the action of a gasket 68. The upper and lower piston assemblies coact to define a path 70 to vent the working cylinder 12 at the appropriate time in the tool operating cycle. The upper piston 60 is slidably disposed within the cover 66 and defines therewith an upper piston chamber 72. The upper piston chamber 72 is sealed from the upper chamber 15 and the atmosphere by O-rings 73 and 74 respectively. A conical or equal force spring 75 located in chamber 72 normally acts to bias the upper piston 60 away from the upper end of the upper cylinder 64.

As illustrated in FIG. 1, the upper piston assembly 60 includes an integral bell portion 76. The integral bell portion 76 is coaxailly and threadably fastened to the piston portion of the upper piston 60. The bell portion 76 includes an axially disposed central chamber 78 and an interconnected transverse chamber 79 that together define the vent path 70 from the outside of the bell 76 to the atmosphere.

Nested within the upper piston assembly 60 is the lower piston assembly 62. Specifically, a cylindrical cavity 80 is defined by the upper piston 60 into which the lower piston 62 is slidably disposed. A conical or equal force spring 82 located in chamber 81 normally biases the lower piston 62 toward the cylinder rim 59 and away from the upper piston 60. The lower piston chamber 81 (see FIG. 2 for a better view) is defined by the cylindrical cavity 80 and the lower piston 62. The lower piston assembly 62 includes bell-shaped portion 83 having a peripheral rim 84. The area of the bell-shaped portion 83 is subject to high pressure air tending to move the piston assembly 62 downwardly greater than that face of the lower piston 62 forming the wall of the lower piston chamber 81 Separating the rim 84 of the bell-shaped portion 83 of the lower piston 62 from the upper edge 59 of the working cylinder 12 define the opening for pressurizing the working piston 22.

Figure 3:
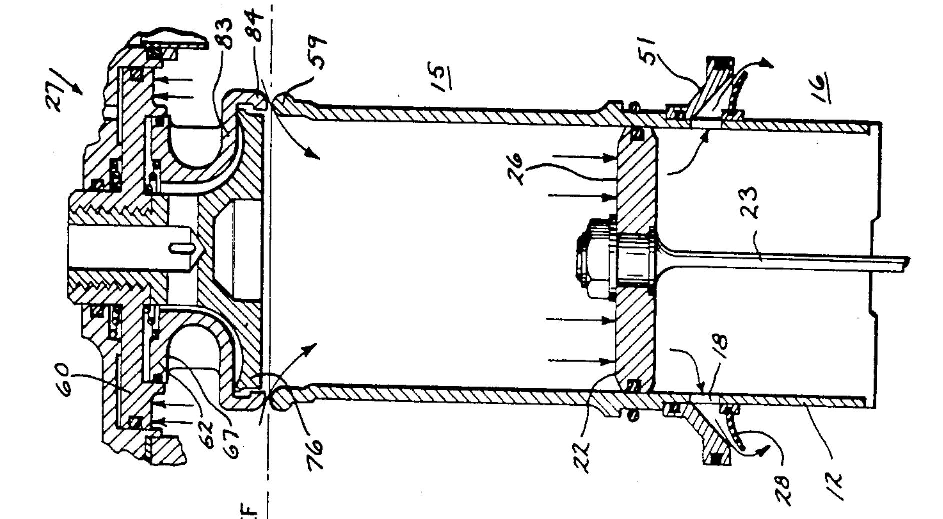
FIG. 3 is a partial, cross-sectional, side, elevational view of the fastener driving tool of FIG. 1 showing the tool towards the end of its driving stroke with the working piston having moved from its retracted position to a driven position.
Figure 2:
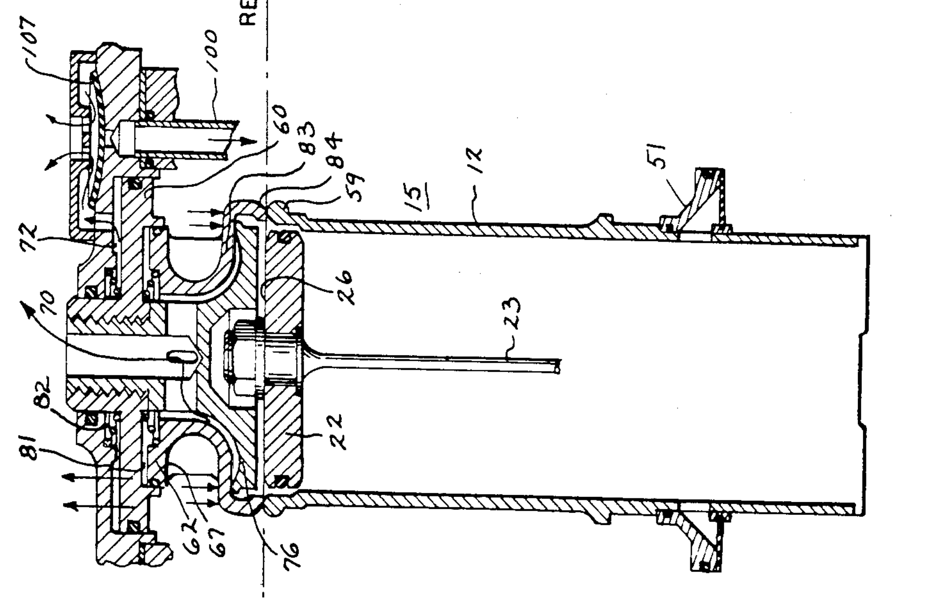
FIG. 2 is a partial, cross-sectional, side, elevational view of the fastener driving tool of FIG. 1 illustrating the position of the principal components shortly after the tool has been placed into operation.

Specifically, raising the lower piston 62 from the upper portion 24 of the working cylinder 12 opens a path between the upper chamber 15 (which is in continuous communication with a supply of high pressure air 55 in the hollow housing) and the inside of the working cylinder 12 above the working piston 22. This pressurizes the upper face 26 of the working piston 22 and forces it through its driving stroke. An O-ring gasket 85 normally provides a pressure barrier or air seal between the two faces of the working piston 22 and the working cylinder 12 when the working piston 22 is stroked. It is to be noted as will be described in the method of operation that the specific configuration insures that air is not admitted to fire the working piston 22 unless the vent path 70 from the working cylinder 12 is shut off. Similarly, as will be described in the method of operation, air is not vented from the working cylinder 12 until the lip 84 of the lower piston seats against the working cylinder 12. This unique valving sequence prevents wasting of pressurized air. In other words, pressurized air is used to the maximum extent possible to actuate the tool 10. Briefly, the main valve assembly is so constructed that when air in chamber 72 is exhausted piston 60 moves upto seal bell portion 76 against bell portion 82 to seal off vent path 70 (FIG. 2). Further movement of piston 60 carries piston 62 away from rim 89 to admit air above piston 22 (FIG. 3).

Having completed our discussion of the main valve assembly 27, the component used to operate the tool will now be discussed. These components include a trigger operated control valve 86, and a snap action valve assembly 105.

More particularly, the working piston 22 and working cylinder 12 and, specifically, the main valve assembly 27 are placed in operation by means of a trigger-actuated control valve 86. This control valve 86 is mounted within the tool housing 11 adjacent to the lower end of the cylindrical portion 14 of the tool. In the particular embodiment illustrated the trigger control assembly is disposed between the air storage chamber 55 and the main valve assembly 27. The control valve 86 which is merely exemplary of one that can be used includes a central flow chamber 87 into which a shaft valve element 88 is inserted. The central flow chamber 87 houses a ball valve element 89. Communicating with the central flow chamber 87 is an inlet port 90 that communicates with storage 55 and an exhaust port 91 that leads to atmosphere. 91). Normally, the ball 89 is at rest at the lowered or second position.

Pressure supplied from the air storage chamber 55 forces the ball 89 against the lower seat of the flow chamber 87 thereby sealing off the exhaust port 91. In this sense, the upper portion of the ball acts as a pressurized surface forcing the lower portion of the ball in contact with the exhaust port 91 valve seat. Thus, the control valve 86 may be classified as a two-position, three-way valve that is piloted towards the first position and manually actuated to the second position. As discussed hereinafter, valve assembly 86 functions as a pressurizing and venting valve means for the main valve assembly 27.

Immediately adjacent to the control valve 86 is a conduit section 100 connecting the flow chamber 87 to the upper end 102 of the cover 66. The inside of the conduit 100 is sealed from the air storage chamber 55 and specifically the upper chamber 15 by an O-ring 103.

Immediately above the conduit section 100 on the upper side of the cover 66 is a snap action valve assembly 105. The snap action valve assembly 105 acts to control the a flow path between trigger-actuated control valve 86 and the main valve assembly 27. As will be discussed in a later section describing the overall operation of the tool, the snap action valve assembly 105 provides for rapid tool operation in that it achieves a high volume rate of flow with little, if any, pressure drop. This feature follows from the simple but novel construction of the valve. It also insures that pressurized air is used economically without being unnecessarily leaked to the atmosphere.

Figure 8:
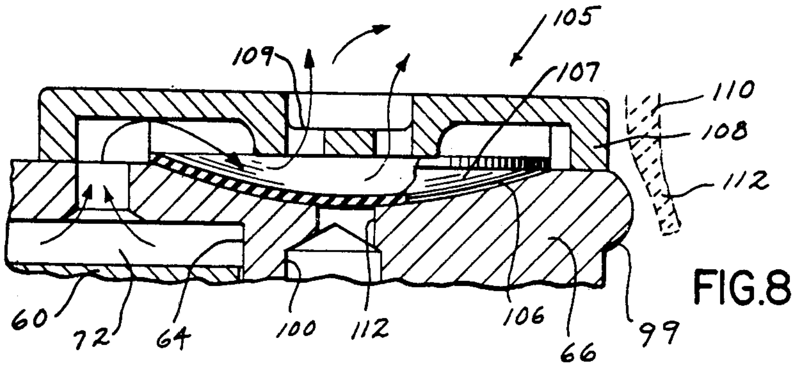
FIG. 8 is a partial, cross-sectional, detailed view of the snap action valve in the venting position shortly after actuation of the tool.
Figure 9:
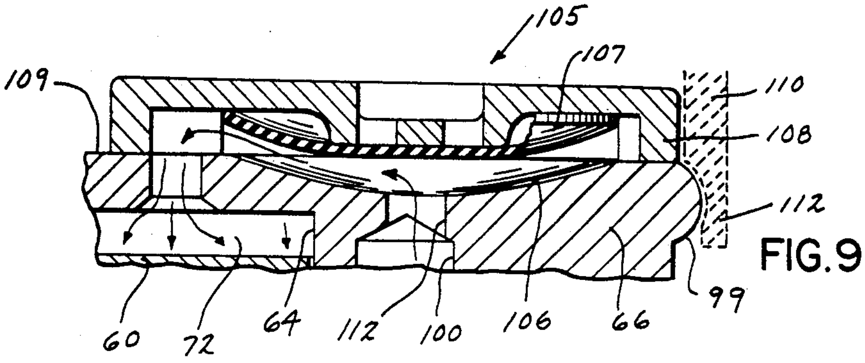
FIG. 9 is a partial, cross-sectional, detailed view of the snap action valve shown in FIG. 8 shortly after the tool has been de-actuated.

The construction of the snap action valve assembly 105 is best understood by referring to FIGS. 8 and 9 for an enlarged view of the snap action valve assembly. The snap action valve assembly 105 includes a seating surface 106, a disc 107 and a housing guide 108. The housing guide 108 is open to the atmosphere through port 109 in the valve cover 66. Specifically, the disc 107 defines a flow path between the conduit 100 and the upper piston chamber 72, on the one hand (FIG. 9), and between the upper piston chamber 72 and the atmosphere through port 109 (via the noise suppression chamber or cap 110), on the other hand (FIG. 8).

As is illustrated in FIG. 9 and FIG. 1 with the tool connected to a high pressure air supply, the application of high pressure air through the conduit section 100 forces the disc 107 upwardly into the housing guide 108, thereby sealing off the port 109 and thus the path to the atmosphere. At the same time, pressurized air is directed into the upper piston chamber 72 to retain the main valve assembly 27 closed against the cylinder 12.

When it is desired to fire the tool to drive a fastener into a workpiece, a finger-actuated trigger assembly 92 operates the valve plunger 88 which moves the ball 89 vertically from a first or at rest position (where the ball seals the exhaust port 91 and opens the inlet port 90) to a second position (where the ball 89 seals the inlet port 90 and opens the exhaust port 91). This action results in the conduit section 100 being vented to atmosphere and the snap action disc 107 to rapidly reposition itself downwardly on the seat 106 to assume the configuration shown in FIG. 8. This opens a path between the upper piston chamber 72 and the atmosphere.

Located on top of the cover 66 is a cap member 110 which is filled with foam 111 to aid in sound deadening. The cap 110 is made of a resilient material and is free to flex outwardly (shown in phantom at 112) so as to establish flow communication with the surrounding atmosphere. This aids in minimizing the sound of air venting from the snap action valve 105 or from the main valve assembly 27 to the atmosphere. A ring 114 is added to the cap 110 to force the venting air to pass through a tortuous path thereby reducing its velocity before escaping to the atmosphere. This ring also provides structural strength and rigidity to the cap 110. The cap 110 is attached to the valve cover 66 by a threaded fastener 120 and washer 121 joined to a bushing 122 fixedly attached to the outside surface of the cover 66. The side of the cap 110 normally forms a snap fitting connection with the outside perimeter of the cover 66 along a shallow lip 99 (See FIGS. 8 and 9).

The remaining components and a principal feature of the invention—the unique recoil dissipation system will now be described.

The lower chamber 16 is used to store air during the piston driving action. The air contained therein is then used to return the piston to its driving position. This chamber is located at the other end of the working cylinder 12. The lower chamber 16 is annular in shape. The flow into and out of chamber 16 is controlled by two reed valves or flapper spring check valves 28 and 30 respectively. Each check valve is a single annular ring of spring steel. The upper one-way check valve 28 permits air to flow from the upper port 18 into the lower chamber 16. The lower one-way check valve 30 permits the flow of air from the lower chamber 16 back into the working cylinder 12 via the lower ports 21.

The working cylinder 12 is slidably supported within the housing 11 by the lower guide 20 and slightly above the base of lower cylinder guide 20 by a shoulder 130 of an upper guide 32. An O-ring 33 provides a seal between the movable working cylinder 12 and the upper guide 32. An O-ring 34 provides a seal between the working cylinder 12 and the lower guide 20. Finally, the lower guide 20 is sealed from the housing 11 by an O-ring 35. Thus, the lower chamber 16 is pressure sealed from the working cylinder 12 and the upper chamber 15.

The lower chamber 16 is closed off at the lower end of the housing 11 by a nose assembly 36, having a nose closure member 38 secured to the cylindrical portion 14 of the housing 11. The nose assembly 36 includes a self-aligning seal 40 of plastic material supported upon the nose closure member 38. A vertical passageway or nose guide 43 is provided within the nose closure member 38 and the driver 23 passes slidably therethrough. The frictional fit between the seal 40 and the driver 23 acts to hold the working piston 22 in the retracted position when the working cylinder 12 is vented.

The hollow housing 11 of the tool also includes a graspable elongated portion 45 extending horizontally outward from a position generally midway from cylinder portion 14 of the tool.

Mounted to the base 46 is a nail magazine assembly 47 holding a row of nails 48 disposed transverse to the path of the fastener driver 23 and the nose closure member 38. Magazine 47 supplies fasteners serially under driver 23 into the nose guide 43 to be driven into the work piece when the working piston 22 and driver 23 descend to the lower end 19 of the working cylinder 12.

At the upper boundary of the lower chamber 16, an annular ring 51 is slidably mounted between the fixed housing 11 and the working cylinder 12 just above the upper ports 18. The annular ring 51 moves with the working cylinder 12. Just below the annular ring is a generally, radially extending flapper check valve 28. This check valve 28 directs flow from the working cylinder 12 into the lower chamber 16. O-rings 50 and 52 provide a seal between the annular ring 51 and the working cylinder 12 and the housing 11 respectively. The flapper check valve 28 is carried by the working cylinder 12. Pressurization of the lower chamber 16 contributes to the forces tending to raise the annular ring 51 and working cylinder 12. After the tool has fired the pressure-forces applied to the ring act to keep the cylinder 12 in the raised position. Pressurized air driving the working piston 22 will continue to flow into the lower chamber 16 through the upper port 18 until the piston 22 on its way up cuts off the supply of air into the lower chamber 16. Rapid return of the piston 22 does not allow the lower chamber 16 to become over-pressurized, and never reaches the pressure in the cylinder 12. This results in considerable air savings.

Once the piston 22 passes the flapper check valve 28, the air in the lower end 19 of the working cylinder 12 has nowhere to escape to and the air disposed therein is compressed to higher and higher pressures. In effect the compressed air acts as an "air spring" relative to the downward rushing working piston 22. This retards the working piston and provides an "air bumper" which eliminates the shock of the piston hitting the bottom which typically occurs in available nailers.

More significantly, the high pressure being built in the lower end of the working cylinder 12 lifts the working cylinder like a piston and acts to rapidly return the piston to its driving position. Accordingly, the working cylinder is driven upwardly, rapidly and without hesitation. Finally, by designing the working cylinder 12 to move in response to compressed air resulting from firing the working piston 22, there is a net energy transfer. In other words, the normal recoil forces caused by the driving action of the piston is at least partially offset by the generation of high pressure beneath the piston and the rapid return of the piston. Moreover, since the mass of the working cylinder 12 is much less than the stationary parts of the tool, the impact experienced when the working cylinder strikes the main valve assembly 27 is negligible. This is a significantly novel approach to fastener driver tool design.

Returning to the description of the lower end 19 of the working cylinder 12, the lower guide 20 includes a second flapper check valve 30. This second check valve 30 permits the flow of pressurized fluid from the lower chamber 16 into the working cylinder 12. The flapper portion of the check valve 30 seats against two O-rings 56 and 57 on either side of lower ports 21. Initially during the driving cycle of the working piston 22, the second flapper check valve 30 is seated against O-rings 56 and 57 thereby sealing the lower chamber 16 from the underside of the working piston 22. Thus, high pressure air cannot enter the lower chamber 16 through the lower port 21.

Once the pressure in the lower chamber 16 becomes equal to or greater than the pressure in the working cylinder 12, the first check valve 28 closes. Once the air pressure in the lower chamber 16 exceeds the pressure of the air located in the lower end of the working cylinder 12 below the working piston 22, the second check valve 30 pops open. The volume of the lower chamber 16 is designed to provide the correct relationship of pressure relative to the movement of the working piston 22 in the working cylinder 12. This completes the detailed description of the individual components of the tool 10.

OPERATION OF THE TOOL

The integrated operation of the fastener driver tool and the components previously described will now be explained. To aid in understanding the movable relation between the various parts, a reference line at the common intersection of the working cylinder rim 59 and the lower piston rim 84 joins FIGS. 2 through 7. The initial configuration of the tool is shown in FIG. 1.

To place the tool in operation to drive a fastener, it is only necessary for the operator to actuate the trigger assembly 92. Actuation of the trigger assembly operates the control valve 86 to vent the conduit section 100 (see FIG. 2). Venting the conduit section 100 allows the disc 107 of the snap action valve 105 to assume the position shown in FIG. 8. This provides a vent path between the atmosphere and the upper piston chamber 72. The air under pressure in the upper chamber 15 combined with the rapid venting of the upper piston chamber 72 above upper piston 60 results in the upper piston 60 being moved rapidly in the upward direction. Furthermore, since the flared or bell portion 83 (always in communication with the upper chamber 15) of the lower piston 62 has a greater surface area than the upper portion 67 (always in communication with the upper chamber 15) of the lower piston 62 and since the lower piston chamber 81 is always vented to atmosphere via vent path 70, there is a net downward force exerted on the lower piston 62. The lower piston chamber bias spring 82 also contributes to this force. Thus, there is upward movement of the upper piston 60 and downward movement of the lower piston 62. Once the inside of the bell portion 83 of the lower piston 62 comes in contact with the flared portion 76 of the upper piston 60 to seal off the flow of high pressure air therebetween, the vent path 70 is shut off. See FIG. 2.

Continued upward movement of the upper piston 60 carries the lower piston 62 upwardly and separates the lower piston 62 from the upper rim 59 of the working cylinder 12. This opens a large flow path between the upper chamber 15 and the upper face 26 of the working piston 22 which admits high pressure air from the upper chamber 15 and forces the working piston 22 rapidly in the downward direction.

As mentioned above, the snap action valve 105 is operated in response to the trigger actuated control valve 86. The snap action valve 105 is characterized by a rapid time response and a high flow rate. This is because the area of the disc is very large in relation to the stroke of the valve. In other words, the valve is characterized by a short transition between the fully open and fully shut conditions. If the upper piston chamber 72 is vented rapidly and the valve assembly moves rapidly to the full open position, there is little pressure loss between the upper chamber 15 and the chamber above the working piston 22. The fast opening of the valve assembly 27 and the fact that the atmospheric vent path 70 is sealed off before the main valve 27 eliminates any loss of air from chamber 15 thus contributing to a substantial savings of air.

Figure 4:
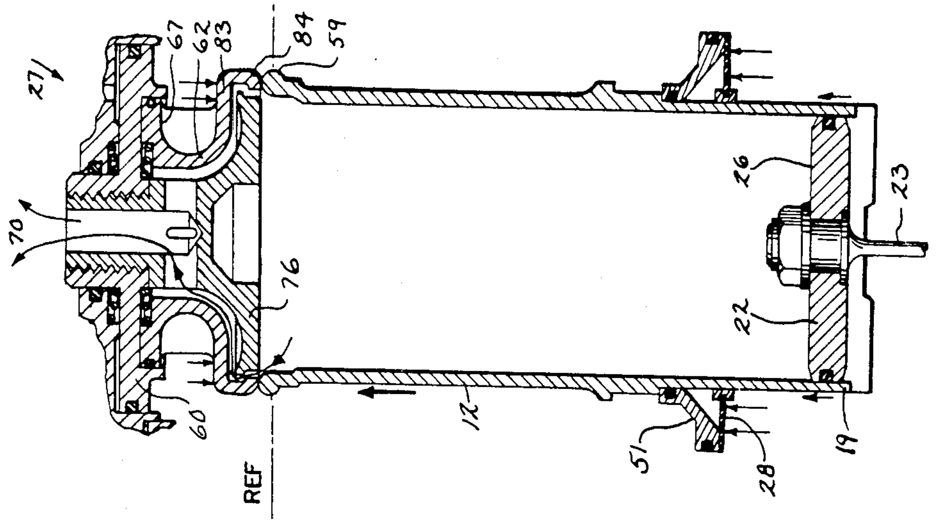
FIG. 4 is a partial, cross-sectional, side, elevational view of the fastener driving tool of FIG. 1, showing the tool after completion of the driving stroke with the working cylinder having moved upwardly from its extended or driven position.

FIG. 3 shows the principal components of the tool shortly after firing the working piston 22. The air contained in the space between the lower side of the working piston 22 and the working cylinder 12 is compressed and forced through peripheral upper ports 18 and flapper valve 28. This results in the pressurization of the lower chamber 16. Continued downward movement of the working piston 22 eventually results in the pressure within the lower chamber 16 becoming equal to the pressure on the upper side 26 of the working piston 22 at which time the check valves 28 close (FIG. 4).

Further pressurization of the air at the lower end 19 of the working cylinder retards the descent of the working piston 22 and dissipation of the energy of the working piston. Air trapped under the working piston 22 provides a cushion for dampening the downward motion of the working piston 22. The increased pressure being developed in the lower end 19 serves as a cushion to prevent the working piston 22 from bottoming out. Specifically, in FIG. 4, the space 23 is an "air spring" which avoids contact between the working piston 22 and the bottom of the working cylinder 12. In addition it results in a net upward or lifting force acting on lower edge of the working cylinder 12 which forces the slidably disposed working cylinder 12 in the upward direction. This quickly shuts off the pressurization path leading from chamber 15 into the cylinder 12 defined between the upper edge 59 of the working cylinder 12 and the rim 84 of the lower piston assembly 62. FIG. 4 illustrates the configuration assumed by the tool 10 under this situation. High pressure developed in the space 19 is acting on the bottom rim of the cylinder 12 which accounts for the virtually instantaneous shutting off of pressurized air to the working cylinder.

Furthermore, the net pressure force developed on the sliding working cylinder 12 is greater than the pressure-force acting on the unbalanced portion of the flared portion 83 of the lower piston assembly 62. This force imbalance results in the lower piston 62 being forced upwardly to reduce the volume of the lower piston chamber 81 (which is always at atmospheric pressure). Consequently, a vent path 70 is opened between the interior of the upper end 24 of the working cylinder 12 and the atmosphere (via the valve cap 110). This vents off the air on the firing side 26 of the working piston 22 (see FIG. 4).

The tool is thus vented rapidly and the working piston is rapidly returned from the driven to the driving position. This contributes to the quick time response of the tool. This in turn improves the overall efficiency of the tool.

It should be noted that laboratory measurements show that the rapid moving up of the working cylinder 12 saves a substantial portion of the air that would be otherwise wasted. Due to the fact that this sealing action takes place, and in particular the way the air is shut off from the interior of the working cylinder 12 before the vent to atmosphere is opened by the upward movement of the lower piston 62, at no time is high pressure air lined up in a path to the atmosphere. This innovative design has the additional benefit of improving "recovery time". Since air pressure is not unnecessarily leaked to the atmosphere, pressure in the tool is not reduced before the tool is ready to be cycled again. This has been the usual practice in conventional tools.

Furthermore, it should be emphasized that the quick upward movement of the working cylinder 12 is substantially due to the high pressure forces acting at the bottom rim or edge of the working cylinder 12.

Another major point to be emphasized at this juncture is that by rapidly returning the working piston 22 to the driving position, the recoil forces normally experienced in such a tool are significantly reduced. Tests have been conducted showing that there are savings amounting to 28% less recoil. Consequently, such an advantage makes it much easier for the operator to handle the tool, since he is not subject to the high recoil forces normally acting against the operator's hands.

Figure 5:
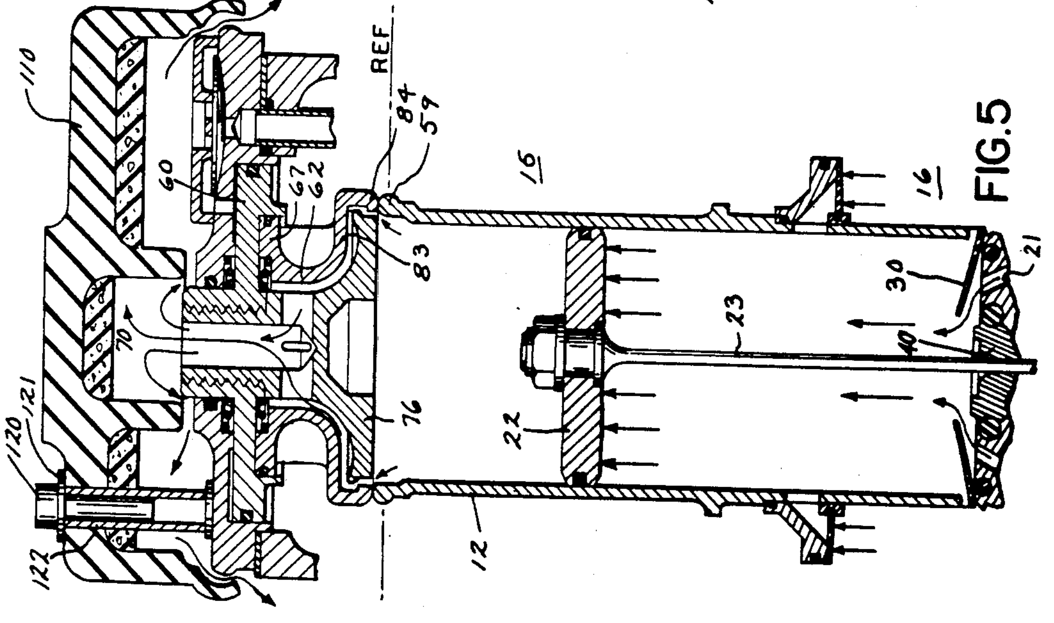
FIG. 5 is a partial, cross-sectional, side, elevational view of the fastener driving tool of FIG. 1 showing the vent path of the air above the driving piston to atmosphere while the working piston is being driven to its retracted position.

FIG. 5 illustrates the piston of the working piston 22 after opening the vent path 70 to atmosphere. As previously mentioned, during the downward stroke the air under the piston is compressed to a high pressure and this pressure acts on the underside of the piston to move it upward to its driving position. In addition, since the pressure in the lower chamber 16 is greater than atmospheric, air expands from the lower chamber 16 through the lower ports 21 and check valves 30. This creates an additional net upward force on the lower side of the working piston 22.

Figure 6:
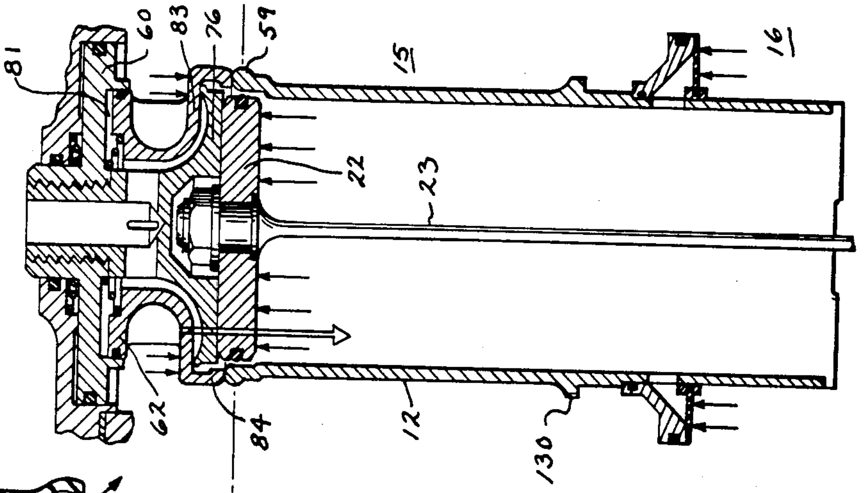
FIG. 6 is a partial, cross-sectional, side, elevational view of the fastener driving tool of FIG. 1, showing the working piston upon completion of its return stroke with the venting to atmosphere shut off.
Figure 10:
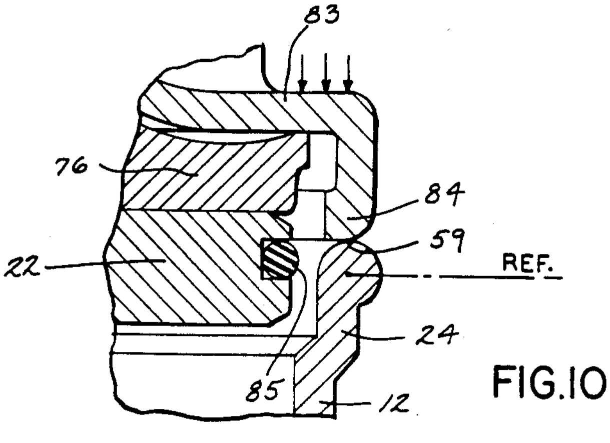
FIG. 10 is a partial, enlarged cross-sectional, detailed view of the pressurizing and venting means, the working piston and the working cylinder with the pressurization and venting paths shut-off comparable to FIG. 6.

FIG. 6 illustrates the working piston 22 after it has reached top dead center (TDC). Because the air above the working piston 22 has been reduced to substantially that of the atmosphere, the net pressure-force acting on the bell-shaped portion 83 of the lower piston 62 is now greater than the pressure-force on the inside surfaces of the lower piston assembly 62. Consequently, the lower piston assembly 62 is forced downwardly and contacts the bell portion 76 of the upper piston 60, with the result that the vent path between the interior of the working cylinder 12 and the atmosphere is shut off. This specific configuration is illustrated in FIG. 10. This net downward force also moves the working cylinder 12 until the lower piston 62 is resting on the bell portion 76 of the upper piston 60. The pressure remaining in the lower chamber 16 acts mostly on the ring 51 to maintain the upward force on the working cylinder 12, therefore maintaining the seal between the upper edge 59 of the working cylinder 12 and the rim 84 of the lower piston assembly 62.

Figure 7:
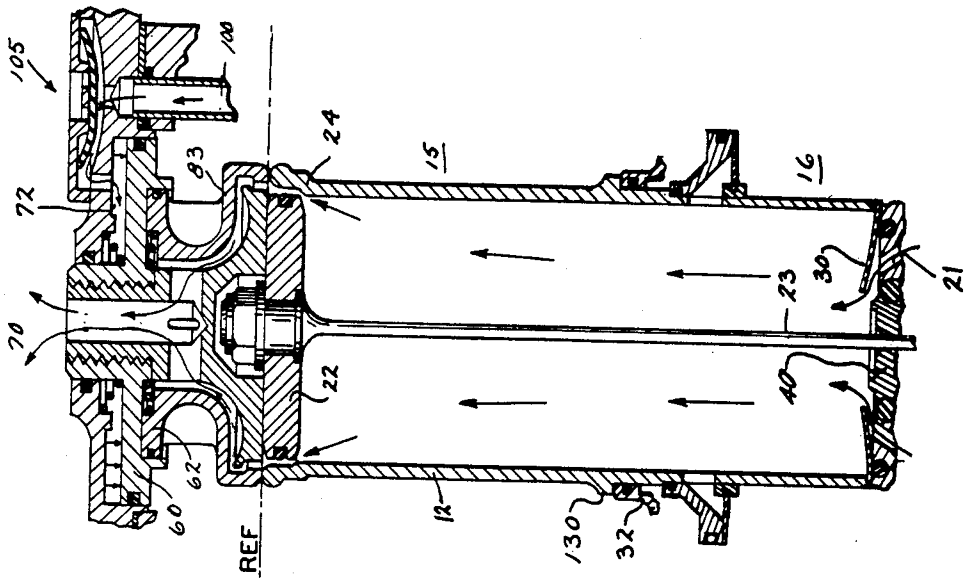
FIG. 7 is a partial, cross-sectional, side, elevational view of the fastener driving tool of FIG. 1 shortly after release of the trigger-operated valve and with the snap action valve closing off the atmospheric port.

Finally, the cycle is completed when the operator releases his trigger operated control valve 86 (see FIG. 7.). This causes repressurization of the conduit 100 causing the snap action valve 105 to assume the configuration shown in FIG. 9. This rapidly pressurizes the upper piston chamber 72 which forces the upper piston assembly 60 downwardly. Since the pressurization of upper piston chamber 72 is quite rapid and since the lower piston chamber 81 is at atmospheric pressure and since there is a constant application of pressurized air on the bell-shaped portion 83 of the lower piston 62, the working cylinder 12 is forced downwardly into the position shown in FIGS. 1 and 7.

It should be noted that the upper guide 32 limits the downward stroke of the working cylinder 12. Specifically, a lip or flange 130 on the outer surface of the working cylinder abuts against the upper edge of the upper guide 32 during the downward stroke of the working cylinder 12. In effect the flange 130 shims the cylinder in the axial direction. This insures that the lower rim or edge of the working cylinder is sufficiently exposed to be responsive to pressure buildup at the lower end 19 of the working cylinder 12 when the working piston reaches the position shown in FIG. 4.

Figure 11:
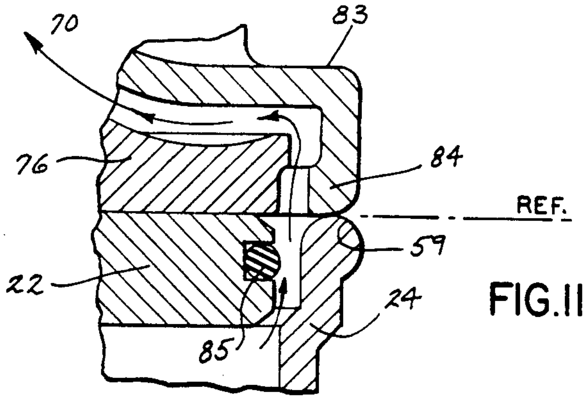
FIG. 11 is a partial, cross-sectional, detailed view of the pressurizing and venting means, the working piston and the working cylinder shown in FIG. 10 with the venting path opened comparable to FIG. 7.

Returning to the operation of the tool, once the downward moving upper piston 60 comes into contact with the lower piston 62, (contact is first made in the lower piston chamber 81) continued downward movement of the upper piston 60 opens an atmospheric vent path 70 from the interior of the working cylinder 12. This is illustrated in FIG. 11. Since the working piston 22 is already at TDC and since the upper edge 24 of the working cylinder 12 has an inner diameter generally greater than the outer diameter of the working piston 22, the interior of the working cylinder 12, and specifically that portion below the working piston 22, is vented to atmosphere. This rapidly vents the pressure in the working cylinder from the pressurization and expansion of air in the lower chamber 16. Second check valves 30 open to bleed off pressure in the lower chamber 16. The working piston 22 is held at TDC by the friction fit between the seal 40 and the driver 23.

It will be appreciated that the improved fastener abuting tool 10 previously described, provides an increase in efficiency, driving force, speed of operation, noise reduction and recoil control at any given air pressure in comparison with prior art expediences. This is because the tool 10 employs valves having a rapid response time and components cooperating with each other by a series of actions and reactions to control the flow of fluid energy. By way of example, the novel tool herein has a second level and an impulse much below that of existing tools.

Of course, as was otherwise stated, the apparatus just described may be used in related tool applications or indeed in any application calling for the use of an impulse of pressurized air. For example, the inventions contained herein may be employed in any type of pneumatic linear motor.

What is claimed is as follows:

1. A method of reciprocably moving a pneumatically operated piston for driving fasteners into a workpiece, said piston being slidably mounted within a cylinder, which comprises the steps of:
(a) supplying air under pressure to a chamber above the piston;
(b) controlling the flow of high pressure air from said chamber into the cylinder to force the piston through a driving stroke thereby forcing a fastener into a workpiece;
(c) storing air admitted into the cylinder above the piston used to drive the piston through its driving stroke;
(d) compressing the air within the cylinder below the piston to form a cushion thereby preventing said piston from striking an end of the cylinder to reduce the impact forces generated by the piston;
(e) venting off the air above the piston to the atmosphere; and
(f) returning the air stored during the driving stroke of said piston into the cylinder beneath the piston to force said piston to a position for driving another fastener.

2. The method set forth in claim 1, further including the steps of:
(a) preventing the venting of air from above the piston before the supply of air under pressure is directed above the piston to force the piston through its driving stroke whereby the supply of air under pressure is not directly discharged to the atmosphere.

3. The method set forth in claim 1, further including the step of:
(a) preventing the venting of air from above the piston to the atmosphere before admitting air into said cylinder to drive the piston.

4. The method set forth in claim 1, further including the step of:
(a) exerting a force in a direction opposite to the driving stroke of the piston to counteract the impact force of the piston during its driving stroke thereby reducing the impact forces generated by the piston.

5. The method set forth in claim 4, wherein the step of exerting a force in a direction opposite to the driving stroke includes the following steps in order:
(a) closing off the flow of air into the cylinder above the piston; and
(b) venting the air from the cylinder and above the piston to the atmosphere whereby said supply of air under pressure is not discharged to the atmosphere and the piston is rapidly returned following said driving stroke.

6. The method defined in claim 5 further including the step of:
(a) muffling the sound of the air emitted from the flow of air vented to the atmosphere.

7. A method of pneumatically driving nails, staples and the like into a workpiece by a fastener driver attached to a piston, said piston being slidably mounted within a cylinder, which comprises the steps of:
(a) supplying air under pressure to a chamber above the piston;
(b) controlling the flow of high pressure air from said chamber into the cylinder to force the piston through a driving stroke thereby forcing a fastener into a workpiece;
(c) storing air admitted into the cylinder above the piston used to drive the piston through its driving stroke;
(d) compressing the air within the cylinder below the piston to form a cushion thereby preventing said piston from striking an end of the cylinder and reducing the impact forces directed at the user of the fastener driver;
(e) venting off the air above the piston to the atmosphere; and
(f) returning the air stored during the driving stroke of said piston into the cylinder beneath the piston to force the piston through its return stroke whereby the piston is repositioned to drive another fastener.

8. The method set forth in claim 7, further including the step of:
(a) exerting a force in a direction opposite to the driving stroke of the piston to counteract the impact force of the piston during its driving stroke thereby reducing the impact forces directed to the user of the fastener driver.

9. The method set forth in claim 8, wherein the step of exerting a force in a direction opposite to the driving stroke includes the following steps in order:
(a) closing off the flow of air into the cylinder above the piston; and
(b) venting the air from the cylinder and above the piston to the atmosphere whereby said supply of air under pressure is not discharged to the atmosphere and the piston is rapidly returned following said driving stroke.

10. The method defined in claim 9 further including the step of:
(a) muffling the sound of the air emitted from the flow of air vented to the atmosphere.

* * * * *